(12) United States Patent
Shah et al.

(10) Patent No.: US 11,295,148 B2
(45) Date of Patent: Apr. 5, 2022

(54) SYSTEMS AND METHODS OF PREVENTING REMOVAL OF ITEMS FROM VEHICLES BY IMPROPER PARTIES

(71) Applicant: Ford Global Technologies, LLC, Dearborn, MI (US)

(72) Inventors: Romil Shah, Santa Clara, CA (US); Sakthi Narayanan Balasubramanian, Chennai (IN); Shounak Athavale, San Jose, CA (US); Anuja Anil Shirsat, Mountain View, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 169 days.

(21) Appl. No.: 16/581,059

(22) Filed: Sep. 24, 2019

(65) Prior Publication Data

US 2021/0089798 A1    Mar. 25, 2021

(51) Int. Cl.
| | |
|---|---|
| *G06K 9/00* | (2006.01) |
| *H04B 1/3827* | (2015.01) |
| *H04L 67/12* | (2022.01) |
| *G06K 9/62* | (2022.01) |
| *G06T 7/73* | (2017.01) |
| *H04N 5/247* | (2006.01) |
| *G06K 9/46* | (2006.01) |
| *G08B 7/06* | (2006.01) |
| *G08B 13/22* | (2006.01) |
| *G06T 7/00* | (2017.01) |

(52) U.S. Cl.
CPC ........... *G06K 9/00832* (2013.01); *G06K 9/46* (2013.01); *G06K 9/6201* (2013.01); *G06T 7/73* (2017.01); *G06T 7/97* (2017.01); *G08B 7/06* (2013.01); *G08B 13/22* (2013.01); *H04B 1/3833* (2013.01); *H04L 67/12* (2013.01); *H04N 5/247* (2013.01); *G06T 2207/30244* (2013.01); *G06T 2207/30268* (2013.01)

(58) Field of Classification Search
CPC .... G06K 9/00832; G06K 9/46; G06K 9/6201; G06T 7/73; G06T 7/97; G06T 2207/30244; G06T 2207/30268; G08B 13/22; G08B 7/06; H04B 1/3833; H04L 67/12; H04N 5/247
See application file for complete search history.

(56) References Cited

U.S. PATENT DOCUMENTS

| | | | |
|---|---|---|---|
| 9,607,214 B2 * | 3/2017 | Nerayoff | G06T 7/20 |
| 10,017,117 B2 * | 7/2018 | Lewis | B60R 1/00 |
| 10,311,704 B1 * | 6/2019 | Xu | H04L 51/046 |
| 10,493,952 B1 * | 12/2019 | Schwie | E05F 15/72 |
| 2018/0224849 A1 * | 8/2018 | Gordon | G06K 9/6201 |
| 2020/0216078 A1 * | 7/2020 | Katz | B60W 40/08 |
| 2021/0034888 A1 * | 2/2021 | Ye | G06T 5/008 |
| 2021/0089798 A1 * | 3/2021 | Shah | H04B 1/3833 |

* cited by examiner

Primary Examiner — Gregory M Desire
(74) Attorney, Agent, or Firm — Brandon Hicks; Eversheds Sutherland (US) LLP

(57) ABSTRACT

A method comprising: associating, by a computing device, at least one first item to a first passenger based on the at least one first item being received in an area of a vehicle; associating, by the computing device, at last one second item to a second passenger based on the at least one second item being received in the area of the vehicle; monitoring, by at least two image capture devices, the area of the vehicle; and determining, by the computing device and based on the first passenger taking the at least one second item from the area, an alert.

19 Claims, 7 Drawing Sheets

SYSTEMS AND METHODS OF PREVENTING REMOVAL OF ITEMS FROM VEHICLES BY IMPROPER PARTIES

TECHNICAL FIELD

The present disclosure relates to systems and methods of transportation and more particularly to preventing removal of items from vehicles by improper parties.

BACKGROUND

Ride sharing services are increasingly becoming a preferred method of transportation. During ride sharing, multiple parties may simultaneously utilize the services of the same vehicle for transportation to unique destinations. By way of example, a first party may onboard the vehicle at a first location and a second party may onboard the vehicle at a second location prior to offboarding of the first party. In instances where items, such as passenger luggage, are stored in the vehicle during transit, there may arise situations where parties have access to one another's luggage and an opportunity to steal luggage. This problem may be more pronounced in autonomous vehicles where the vehicle does not have a driver to monitor party's luggage during onboarding and offboarding events.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plurality terminology may be used interchangeably.

DETAILED DESCRIPTION

Overview

The systems and methods described herein are configured to prevent the unwanted removal of items, such as luggage, from a vehicle by an improper party. In one embodiment, the vehicle can include one or more image capture devices, such as cameras, video cameras, or other sensors or detectors, configured to detect passengers during onboarding and offboarding of the vehicle.

The image capture devices can capture images of the passengers and their respective items during onloading and communicate the captured images to a computing device configured to associate the passenger to their items, e.g., to their luggage. In an embodiment, information regarding each associated passenger and item can be stored in a memory device. During offloading of passengers from the vehicle, the image capture devices can again capture images of the offloading passengers and their interaction with the various items in the vehicle and communicate the images to the computing device which can check a database of associated items and passengers in the memory device to ensure the offloading passenger only takes items associated therewith. In a further embodiment, the vehicle can generate an alert when parties remove items from the vehicle that are not associated therewith. The alert can include a visual alert, an audible alert, another alert type, or any combination thereof. In certain instances, the vehicle can include a user interface configured to show images or video of areas of the vehicle including the items to one or more passengers or drivers of the vehicle. In such a manner, the passengers or driver can monitor the items to ensure no items are improperly removed from the vehicle.

In an embodiment, the memory device can include a temporary database of associated items and passengers. That is, for example, data regarding associations between passengers and items can be temporary. In an embodiment, the data regarding associations between a passenger and one or more items can be deleted after successful offboarding of the passenger. In a more particular embodiment, the data regarding associations between passengers and items may be deleted after access to the vehicle by the offboarding party is terminated.

Illustrative Embodiments

In an embodiment, a method of preventing removal of items from vehicles by improper parties can include associating (e.g., registering) a first item to a first passenger based on the first item being received in an area of the vehicle, associating (e.g., registering) a second item to a second passenger based on the second item being received in the area of the vehicle, monitoring the area of the vehicle, and generating an alert upon occurrence of the first passenger taking the second item from the area. In a particular embodiment, the area of the vehicle can include the trunk of the vehicle. Monitoring of the area can be performed by cameras disposed within or adjacent to the trunk with fields of view within the area.

Figure 1:
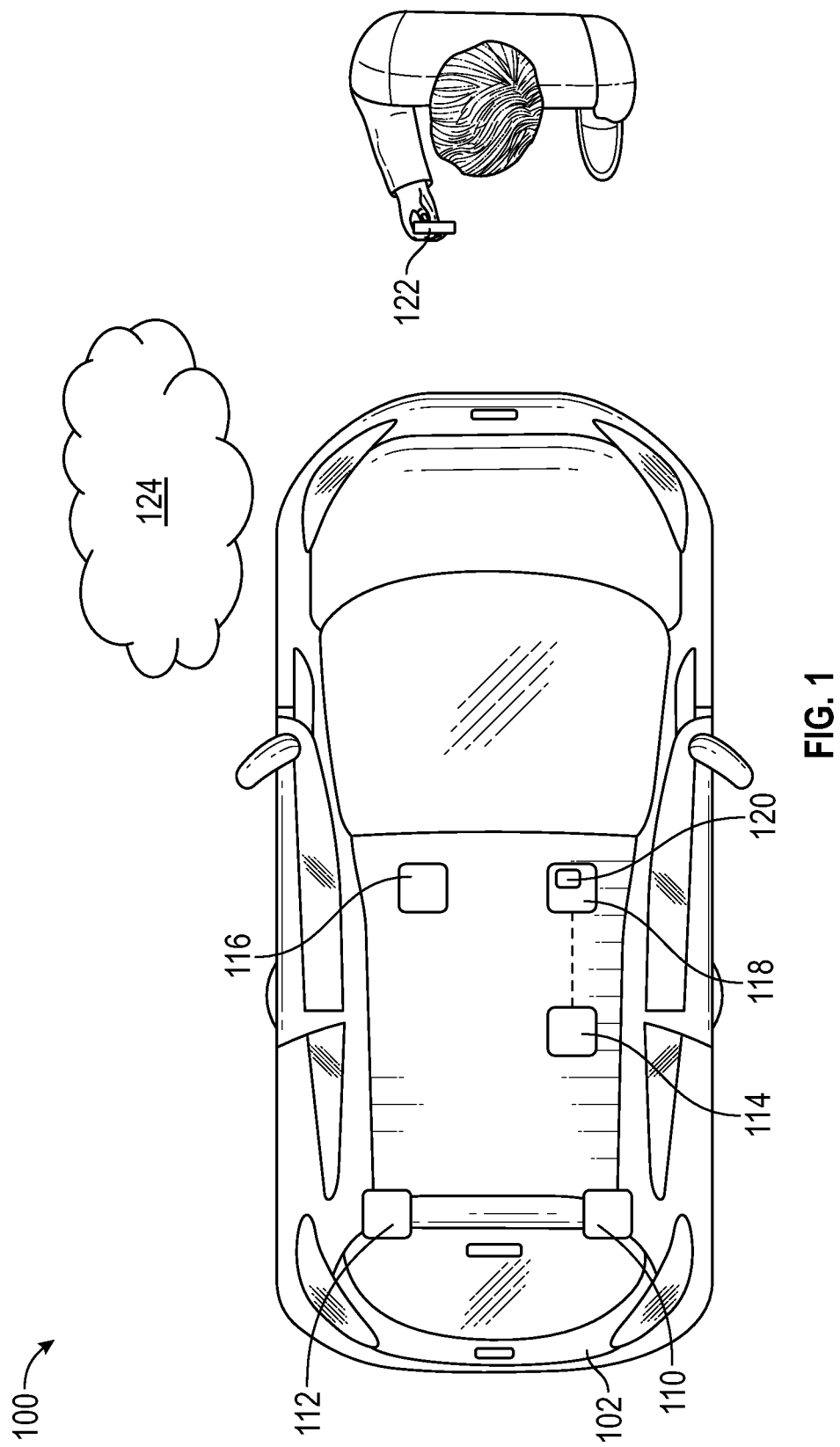
FIG. 1 depicts an illustrative vehicle configured to receive a plurality of parties for ride sharing services.

Turning now to the drawings, FIG. 1 depicts an illustrative vehicle 100 configured to receive a plurality of parties for ride sharing services. In one embodiment, the vehicle 100 is configured to be driven by a human driver. In another embodiment, the vehicle 100 is configured for autonomous or partly autonomous operation. The vehicle 100 can include a passenger vehicle having an area 102 for receiving one or more items, such as luggage and personal items associated with the passengers utilizing the vehicle. The area 102 can include, for instance, a trunk of the vehicle 100 or another storage area disposed within or on the vehicle 100.

Figure 2:
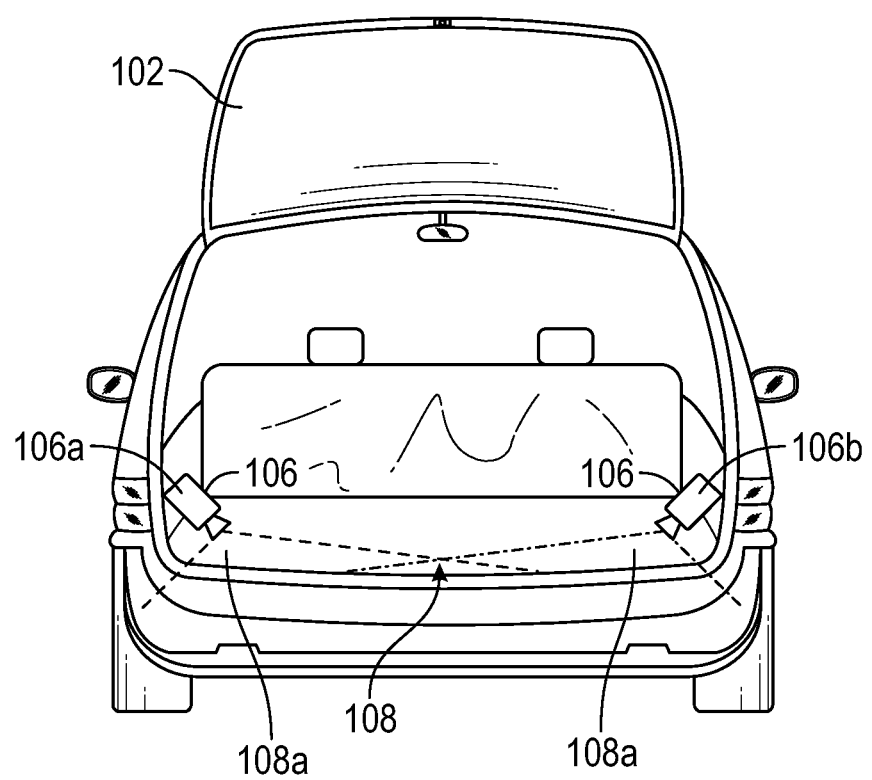
FIG. 2 is an illustrative view of an area of a vehicle configured to receive items from a passenger.

FIG. 2 illustrates the area 102 of the vehicle 100 in accordance with an embodiment. In an embodiment, the area 102 can be monitored by one or more devices configured to monitor the area 102 and communicate the monitored data to a computing device, which may include one or more memories and processors. In an embodiment, the area 102 can be monitored by a plurality of image capture devices 106 having fields of view 108 within the area 102 of the vehicle 100. In a particular embodiment, the image capture devices 106 can include cameras or video cameras configured to generate images of the area 102. In an embodiment, the area 102 can be monitored by at least two image capture devices 106a and 106b. The image capture devices 106a and 106b can be positioned relative to the area 102 such that their fields of view 108a and 108b are not obstructed by items disposed within the area 102. In certain instances, the fields of view 108a and 108b of the image capture devices 106a and 106b can at least partially overlap one another. In such a manner, the entire area 102 of the vehicle 100 can be monitored even if the field of view 108a or 108b of one of the image capture devices 106a or 106b becomes obstructed. In a particular embodiment, the image capture devices 106a and 106b can be disposed on opposite, or generally opposite, sides of the area 102.

In certain instances, the image capture devices 106 can be configured to selectively capture images of the area 102. For instance, the image capture devices 106 can be configured to capture images upon occurrence of a condition, such as opening of a door or hatch associated with the area 102, motion within or adjacent to the area 102, or both. In an embodiment, the image capture devices 106 can be configured to be in standby or off modes when the area 102 is not being actively engaged, e.g., when the door or hatch associated with the area 102 is closed or no motion is occurring within or adjacent to the area 102. In an embodiment, the vehicle 100 can include a sensor 110 (FIG. 1) configured to detect movement within the area 102 or adjacent thereto. In another embodiment, the vehicle 100 can include a sensor 112 configured to detect the position of the door or hatch associated with the area 102. The sensor 112 can detect when the door or hatch is in the open position, closed position, or both and communicate the position or adjustment of position to a computing device 114 or directly to the image capture devices 106. In instances where the sensor 112 detects the door or hatch is in the open position, the image capture devices 106 can be configured to capture images of the area 102. To the contrary, when the sensor 112 detects that the door or hatch is in the closed position, the image capture devices 106 can be in standby or off mode. In such a manner, the batteries of the vehicle 100, image capture devices 106, or both can be conserved when the threat of improper item removal is not imminent.

In an embodiment, the image capture devices 106 can be configured to communicate with one or more displays 116 disposed within the vehicle 100. The displays 116 can be configured to display images or video from the image capture devices 106 of the area 102. The displays 116 can be disposed, for example, within passenger zones of the vehicle, such as within seatbacks, bulkheads, doors, visors, drop down or pop up displays, or any combination thereof. The displays 116 can include, for example, a visual display configured to display an image or video to the passengers and/or driver. In an embodiment, at least one of the displays 116 can broadcast continuously, e.g., when the threat of improper item removal is both present and not imminent. In an embodiment, the displays 116 can be further configured to display other video not associated with the area 102 during periods of time when the threat of improper item removal is not imminent. In a more particular embodiment, the displays 116 may be selectively adjustable between displaying image of the area 102 and displaying other video not associated with the area 102. In other embodiments, the displays 116 can remain fixed on the area 102 even when the threat of improper item removal is not imminent.

In an embodiment, the vehicle 100 can further include a memory device 118. The memory device 118 can be stored locally within or on the vehicle 100. The memory device 118 can be in communication with the computing device 114. After relating items to associated passengers, the computing device 114 can communicate the relation to the memory device 118 for storage. In an embodiment, the memory device 118 can include a database 120 configured to store information relating items with their associated passengers. In an embodiment, the database 120 can include a temporary database configured to remove associations between passengers and items upon successful offboarding of the passenger. In such a manner, no passenger information remains stored on the memory device 118 after a successfully completed transportation scenario. In other instances, the memory device 118 can store associations between passengers and items after completion of the transportation scenario involving the passenger. This may be useful, for example, in instances where passengers leave items in the vehicle 100 or where issues regarding improper item removal arise after completion of the transportation scenario.

In certain instances, the computing device 114 can include a logic element configured to receive information, such as images, from the image capture devices 106, process the information into storable data, and communicate the data to the memory device 118. In certain instances, the computing device 114 can be configured to detect passengers from images provided by the image capture devices 106 using image tagging capabilities. Image tagging capabilities may detect facial features, clothing or accessories unique to each passenger, body positioning, body height or size, or any other unique identifying information associated with the passenger. In an embodiment, the computing device 114 may further identify unique aspects of the items being introduced into the area 102. Identification can include, for example, unique tagging of size, shape, color, or any other unique aspects of the items being introduced into the area 102. In certain instances, tagging can occur simultaneously with positioning of the item within the area 102. In other instances, tagging can occur after the items have been positioned in the area 102.

In an embodiment, the computing device 114 can be configured to detect the action of the passenger when engaging with items in the area 102 using analysis of the posture and pose of the passenger. Posture and pose can be determined, for example, using skeleton-based relational modeling for action recognition. Using images from the image capture devices 106, the computing device 114 can analyze posture and pose of the passenger to determine, for example, whether the passenger is putting an item into the area 102, adjusting an item within the area 102, removing an item from the area, another action, or any combination thereof. In an embodiment, the computing device 114 can utilize tagging of the passenger and item in combination with action recognition to determine the action and association of passengers with respect to items in the area 102 of the vehicle 100.

In certain instances, at least one of the image capture devices 106, computing device 114, and memory device 118 can be in communication with a remote server, such as a cloud 124. The cloud 124 can provide instructions to the computing device 114, store information and data associated with images captured by the image capture devices 106, or both.

In an embodiment, the vehicle 100 can be configured to generate an alert when a registered item is taken by a non-associated passenger. That is, the vehicle 100 can alert vehicle occupants when an item is improperly taken or adjusted in the area 102 by a non-associated party. For example, a first passenger may place a first item in the area 102 of the vehicle at a first vehicle waypoint. The computing device 114 may associate the first item with the first passenger. The vehicle 100 may then move to a second waypoint and onboard a second passenger with a second item. The computing device 114 may associate the second item with the second passenger. The vehicle 100 can then move to a destination waypoint of the second passenger where the second passenger accesses the area 102 as part of offboarding. During offboarding, the image capture devices 106 can capture images of the area 102 and communicate the images to the computing device 114 which can determine if the second passenger is taking the second item (as permitted) or taking or adjusting the first item (potentially improper). If the second passenger is determined to be taking the first item, an alert can be generated to warn the vehicle occupants of the improper item removal. The warning may be displayed on the display 116 or through one or more other alert generating devices. In certain instances, the alert can be forwarded to one or more smart devices 122 associated with one or more passengers. For instance, the alert can be sent to a smart phone of the passenger associated with the improperly taken item.

Figure 3:
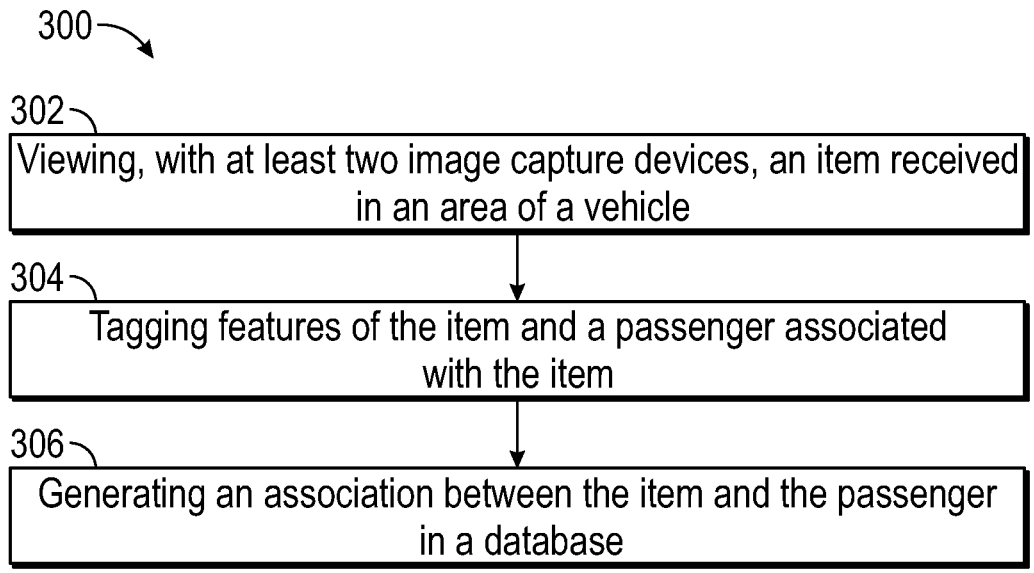
FIG. 3 includes an exemplary flow chart of a method of associating an item to a passenger.

FIG. 3 illustrates an exemplary flow chart of a method 300 of identifying and registering items to passengers. In an embodiment, the method 300 includes viewing 302, with at least two image capture devices, an item received in an area of a vehicle. The item can include luggage or other objects introduced into the area of the vehicle by a passenger. In an embodiment, the area of the vehicle includes a trunk of the vehicle. The at least two image capture devices can capture images of the item being received in the area of the vehicle and communicate the images or data associated therewith to a computing device. The method 300 can further include tagging 304 features of the item and the passenger associated with the item. Tagging 304 can include recognizing features of the item, such as size, color, or shape. Tagging 304 can further include recognizing features of the passenger, such as facial features of the passenger, clothing on the passenger, shape or size of the passenger, or other attributes associated therewith. The method 300 can then generate 306 an association between the item and the passenger in a database using the tagged features of the item and passenger from step 304. In certain instances, the database can include a temporary database, referred to as a dynamic database. The temporary database can generate an association between the item and the passenger until such time as the passenger has successfully offboarded from the vehicle.

Figure 4:
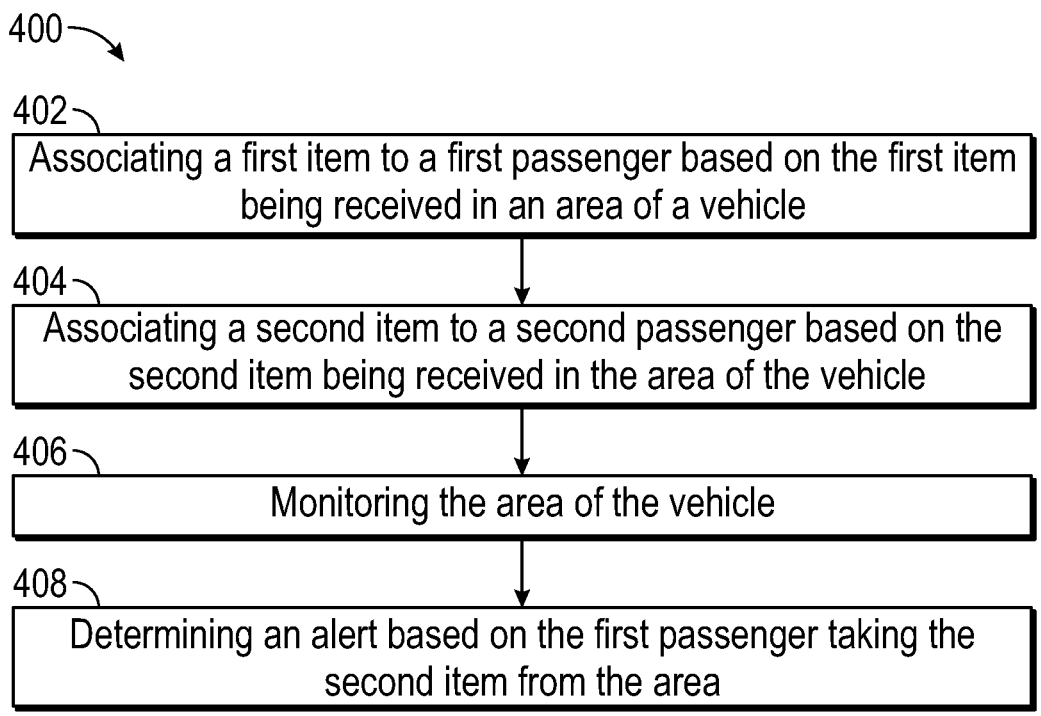
FIG. 4 includes an exemplary flow chart of a transportation scenario including preventing improper removal of items from an area of a vehicle.

FIG. 4 illustrates an exemplary flow chart of a method 400 of transportation including associating 402 a first item to a first passenger based on the first item being received in an area of a vehicle. The area of the vehicle can include, for example, a trunk of the vehicle. The first item can include a first luggage of the first passenger. The method 400 can further include associating 404 a second item to a second passenger based on the second item being received in the area of the vehicle. The method 400 can further include monitoring 406 the area of the vehicle. Monitoring 406 can include the use of image capture devices. The image capture devices can be configured to selectively capture views of the area. In certain instances, one of the parties, such as the first party, may have access to the area of the vehicle while the first and second items are disposed therein. In an embodiment, the vehicle or a component thereof can be configured to generate 408 an alert upon occurrence of the first passenger taking the second item from the area. In another embodiment, the alert can be determined 408 based on the second passenger taking the first item from the area. The alert can be displayed, for example, on one or more user interfaces, such as one or more displays, prompts, or messages disposed within the vehicle, on a smart device of the passenger, or another area for detection.

Figure 5:
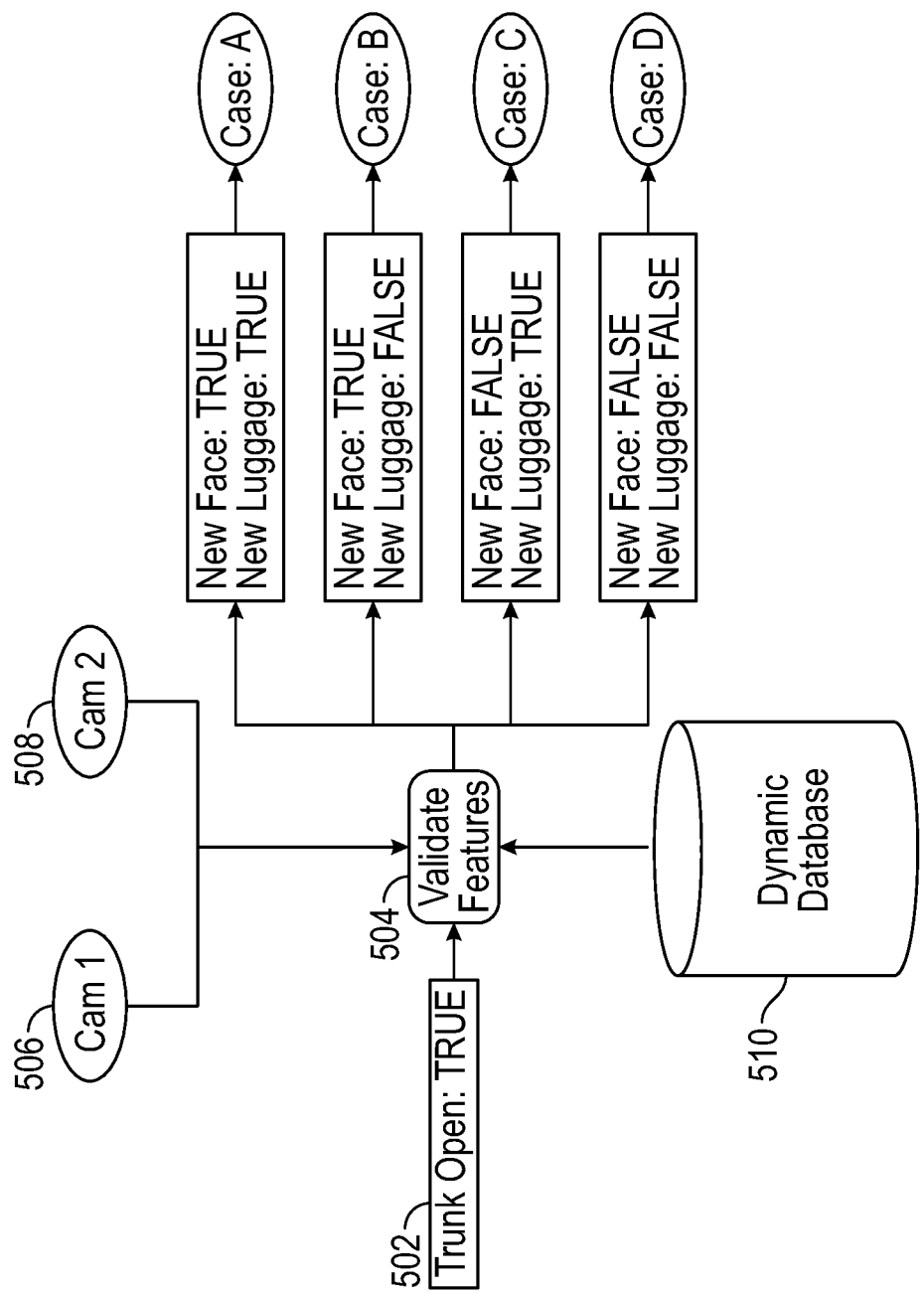
FIG. 5 includes a logic tree of scenarios associated with different use cases of a vehicle.

FIG. 5 includes a logic tree of scenarios associated with different use cases of a vehicle. In an embodiment, a sensor can determine if a trunk of a vehicle is open or closed at element 502. If the trunk is open, a computing device of the vehicle can validate 504 features of the person and any item the person is placing in the vehicle. Feature validation can be determined using two cameras—a first camera 506 and a second camera 508. Validated features can be stored in a dynamic database 510.

The validated features 504 can be used to determine case scenarios: A, B, C, and D. In scenario A, validated features recognize a new face and new luggage. In scenario B, validated features recognize a new face and existing luggage. In scenario C, validated features recognize an existing face and new luggage. In scenario D, validated features recognize a new face and new luggage. Table 1 below expands on possible outcomes of the determined scenarios.

TABLE 1

Outcomes of transportation scenarios

| CASE | SCENARIO | ACTION |
| --- | --- | --- |
| Case A | Features from cameras do not match with features in dynamic database | Register the luggage and the person together in the dynamic database |
| Case B | A new person with registered luggage | Could be new person with someone else's luggage; send alert |
| Case C | A registered person with new luggage | Could be a registered person trying to put new luggage in the area; update dynamic database |
| Case D | A registered person with registered luggage | If the features match, allow the person to take the luggage and delete the validated features from the dynamic database. If features do not match, send alert. |

Figure 6A:
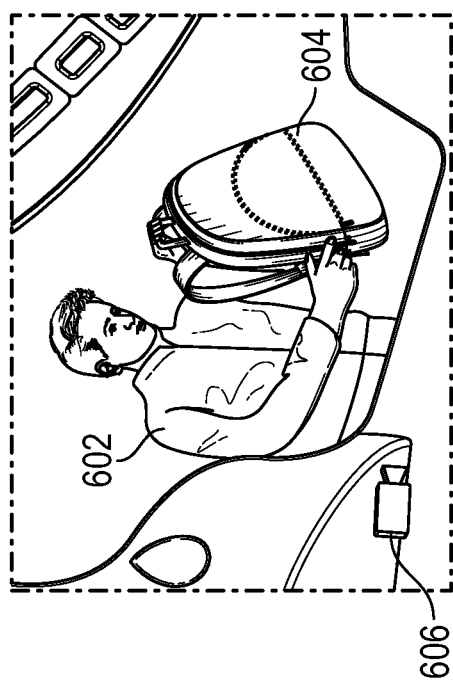
FIGS. 6A to 6C illustrate views taken by an exemplary image capture device disposed in an area of a vehicle configured to receive items, such as personal luggage.
Figure 6C:
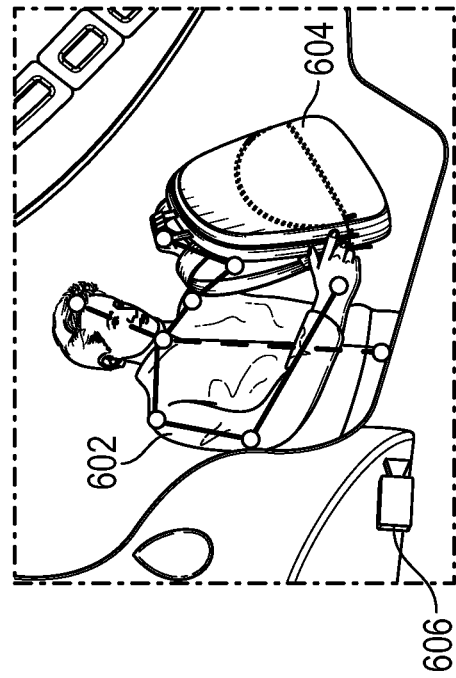
Figure 6B:
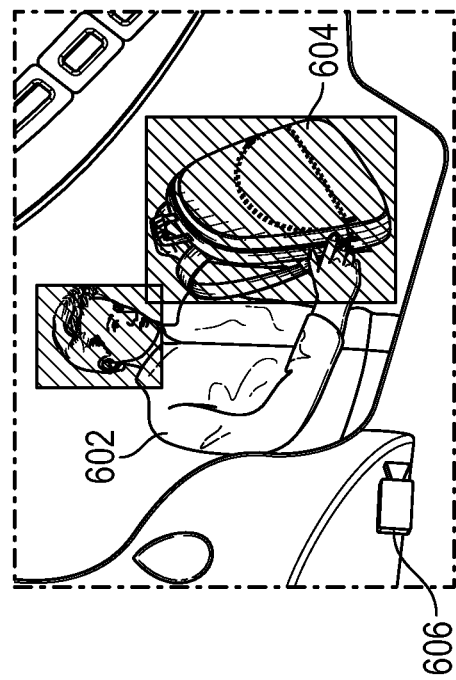

FIGS. 6A to 6C illustrate views taken by an exemplary image capture device disposed in an area of a vehicle configured to receive items, such as personal luggage. As illustrated in FIG. 6A, the image capture device can capture an image of a person 602 placing an item 604 within the area 606. In one embodiment, the image capture devices can be engaged upon sensing a condition relating to the introduction of the item 604 within the area 606. In FIG. 6B, the computing device can recognize the presence of the person 602 and item 604. The computing device can capture features of the person 602 and item 604 and generate an association there between. In the illustrated embodiment, the recognized person 602 and item 604 are outlined in shaded boxes. In other embodiments, the computing device can generate associations without requiring alteration to the images. FIG. 6C illustrates pose analysis of the person 602. In one embodiment, the computing device can determine the action of the person 602 relative to the item 604 through analyzing the pose of the person 602. The computing device can, for example, generate a skeleton frame associated with the biomechanical movement of the person 602 and perform skeleton-based relational modeling for action recognition. Using action recognition, the computing device can analyze whether the person 602 is introducing a new item 604, adjusting the position of an existing item 604, or removing an item 604 from the area. Upon item 604 removal, the computing device can delete information associated with the association between the passenger 602 and item 604.

Figure 7A:
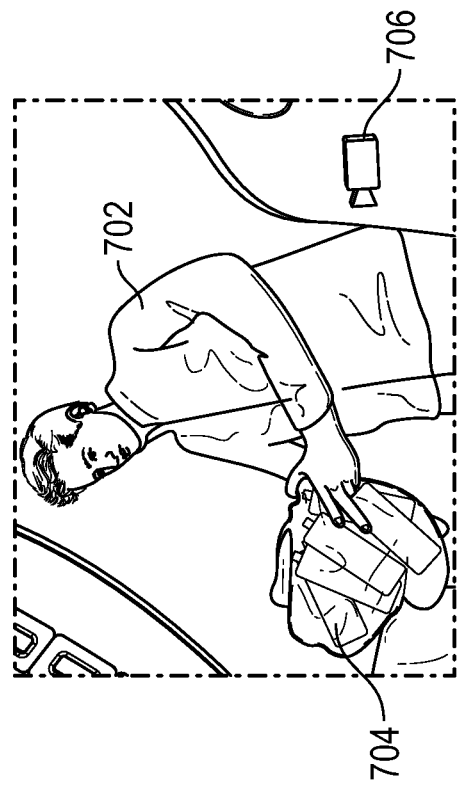
FIGS. 7A to 7C illustrate analysis of a person improperly adjusting or removing an item from an area of a vehicle.
Figure 7C:
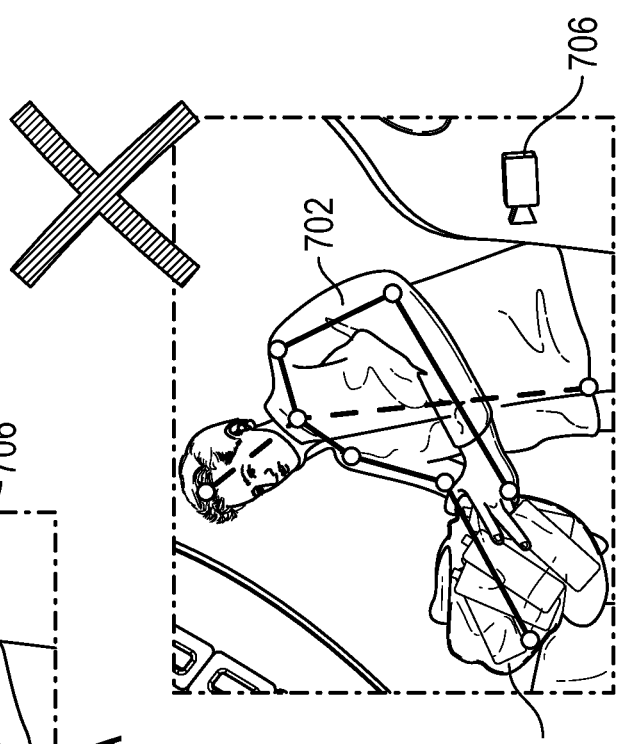
Figure 7B:
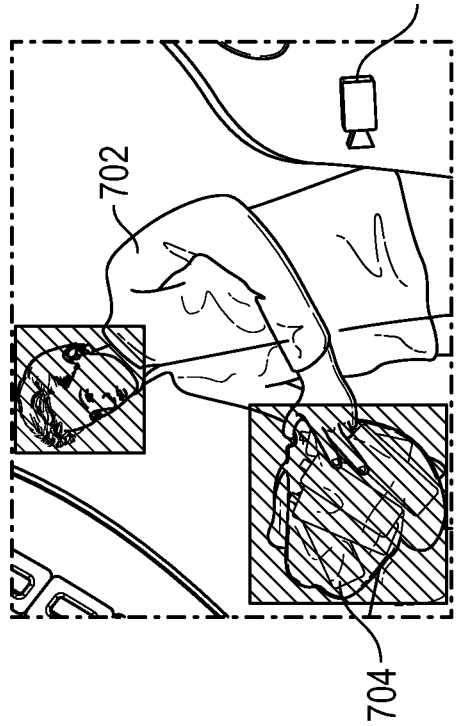

FIGS. 7A to 7C illustrate analysis of a person 702 improperly adjusting or removing an item 704 from an area 706 of a vehicle. In FIG. 7A, the image of the area 706 is captured by an image capture device. In FIG. 7B, a computing device associated with the vehicle can recognize the presence of the person 702 and item 704. In FIG. 7C, the computing device can further perform pose analysis, for example, using skeleton-based relational modeling for action recognition. In the exemplary scenario of FIGS. 7A to 7C, the person 702 adjusting the item 704 is determined to be improperly taking the item 702. The computing device can determine an alert to warn of improper item removal.

Figure 8A:
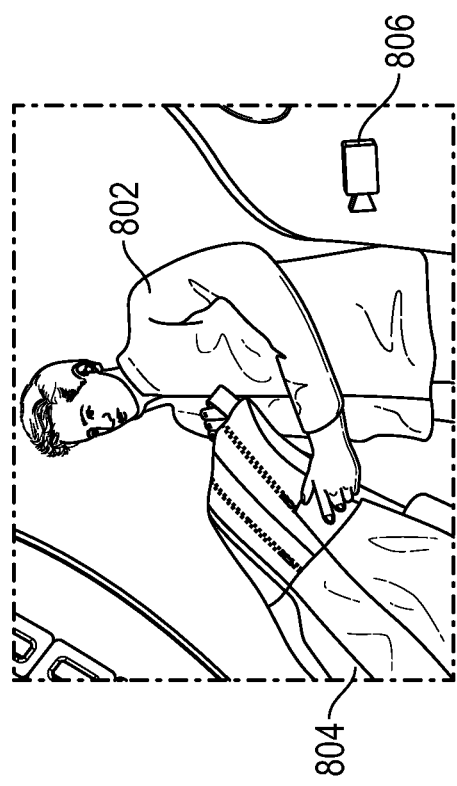
FIGS. 8A to 8C illustrate analysis of an associated person properly adjusting or removing an item from an area of a vehicle.
Figure 8C:
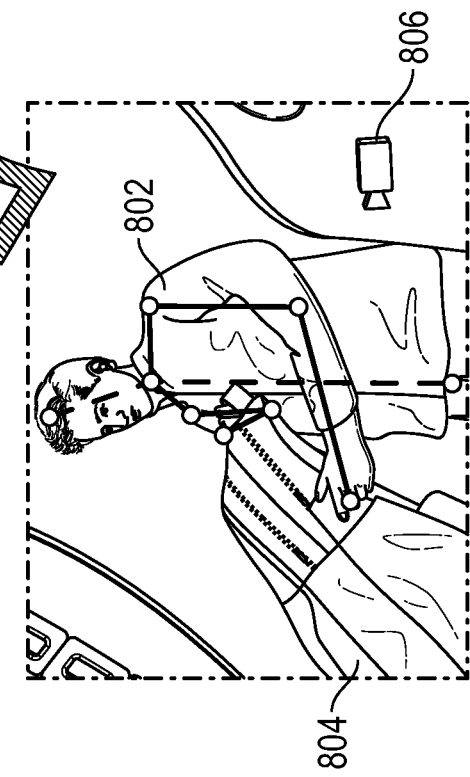
Figure 8B:
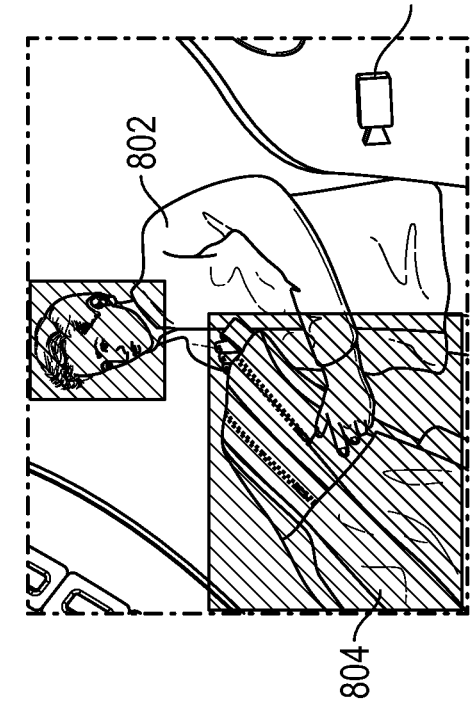

FIGS. 8A to 8C illustrate analysis of a person 802 properly adjusting or taking an item 804 from an area 806 of a vehicle. In FIG. 8A, the image of the area 806 is captured by an image capture device. In FIG. 8B, a computing device associated with the vehicle can recognize the presence of the person 802 and item 804. In FIG. 8C, the computing device can further perform pose analysis, for example, using skeleton-based relational modeling for action recognition. In the exemplary scenario of FIGS. 8A to 8C, the person 802 adjusting the item 804 is determined to be properly taking the item 802. Upon successful removal of the item 804, the computing device can delete information relating to the association between the person 802 and the item 804.

This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below is presented for the purposes of illustration and is not intended to be exhaustive or to be limited to the precise form disclosed. Alternate implementations may be used in any combination desired to form additional hybrid implementations of the present disclosure.

Device characteristics described with respect to one feature of the present disclosure may provide similar functionality in other devices. For example, any of the functionality described with respect to a particular component such as a first processor in a first computer may be performed by another component such as a second processor in another computer. Further, although embodiments have been described in language specific to structural features and/or methodological acts, it is to be understood that the disclosure is not necessarily limited to the specific features or acts described.

In the above disclosure, reference is been made to the accompanying drawings that illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described. Certain words and terms are used herein solely for convenience and such words and terms should be interpreted as referring to various objects and actions that are generally understood in various forms and equivalencies by persons of ordinary skill in the art.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not intended to imply that features, elements, and/or steps are in any way required for one or more embodiments.

It is anticipated and intended that future developments will occur in the technologies discussed herein, and that the disclosed systems and methods will be incorporated into such future embodiments. In sum, it should be understood that the application is capable of modification and variation.

The invention claimed is:

1. A method, comprising:
    associating, by a computing device, at least one first item to a first passenger based on the first item being received in an area of a vehicle;
    associating, by the computing device, at least one second item to a second passenger based on the at least one second item being received in the area of the vehicle;
    monitoring, by at least one image capture device, the area of the vehicle; and
    determining, by the computing device and based on one or more images from the at least one image capture device, that the first passenger took the at least one second item from the area, wherein the computing device is configured to detect a pose of the first passenger to determine if the first passenger is removing the at least one second item from the area using skeleton-based relational modeling; and
    removing association of the at least one first item to the first passenger based on offloading of the first passenger.

2. The method of claim 1, further comprising generating, based on a determination that the first passenger took the at least one second item from the area, an alert.

3. The method of claim 2, wherein the alert is sent to a smart device associated with the second passenger.

4. The method of claim 1, wherein the area comprises a trunk of the vehicle.

5. The method of claim 1, wherein the at least one first item is associated with the first passenger by generating images of the area and an exterior area of the vehicle with the at least one image capture device.

6. The method of claim 5, wherein the at least one image capture device comprises a first image capture device and a second image capture device, and wherein the first and second image capture devices are disposed on opposite sides of the area with overlapping fields of view.

7. The method of claim 1, wherein the at least one first item is associated with the first passenger by the computing device matching features of the first passenger and the at least one first item, and wherein a first feature of the at least one first item is a size, a color, or a shape.

8. The method of claim 1, further comprising:
    associating, by a computing device, a third item to a third passenger based on the third item being received in the area of the vehicle.

9. A vehicle, comprising:
    an area configured to receive one or more items from a plurality of passengers;
    at least one image capture device configured to capture one or more images of the area and an exterior area of the vehicle; and
    a computing device comprising a processing device coupled to a memory, wherein the computing device is configured to
        associate, based on the one or more images, each item with an associated passenger of the plurality of passengers,
        detect a pose of the associated passenger to determine if the associated passenger is removing a first item of the one or more items from an area using skeleton-based relational modeling; and
        remove association of the each item to each of the plurality of passengers based on offloading of the each of the plurality of passengers.

10. The vehicle of claim 9, wherein the computing device is configured to, based on a non-associated passenger taking an item relating to an associated passenger from the area, generate an alert.

11. The vehicle of claim 10, wherein the alert comprises an audible alert, an image-based alert, a tactile alert, or any combination thereof.

12. The vehicle of claim 10, wherein the alert is sent to a smart device associated with the associated passenger.

13. The vehicle of claim 9, wherein the vehicle comprises an autonomous vehicle configured to provide a ride hailing service.

14. The vehicle of claim 9, wherein the at least one image capture device comprises a first image capture device and a second image capture device, and wherein the first and second image capture devices are disposed on opposite sides of the area with overlapping fields of view.

15. The vehicle of claim 9, wherein the area comprises a trunk of the vehicle.

16. The vehicle of claim 9, wherein the computing device is disposed in the vehicle.

17. An autonomous vehicle, comprising:
    a storage area configured to receive a plurality of items from a plurality of passengers;
    at least one image capture device configured to monitor and capture one or more images of the storage area, the plurality of items, and the plurality of passengers; and
    a computing device configured to:
        associate, based on the one or more images, each of the plurality of items to an associated passenger of the plurality of passengers;
        determine that an item of the plurality of items has been removed from the storage area by a passenger of the plurality of passengers that is not associated with the item,
        detect a pose of the passenger to determine if the passenger is removing the item of the plurality of items from the storage area using skeleton-based relational modeling;
        generate, based on the determination, an alert; and
        remove association of the item of the plurality of items to the passenger of the plurality of passengers based on offloading of the passenger.

18. The autonomous vehicle of claim 17, wherein the vehicle is configured to provide a ride hailing service.

19. The autonomous vehicle of claim 17, wherein the storage area comprises a trunk of the vehicle.

* * * * *